Patented Jan. 16, 1945

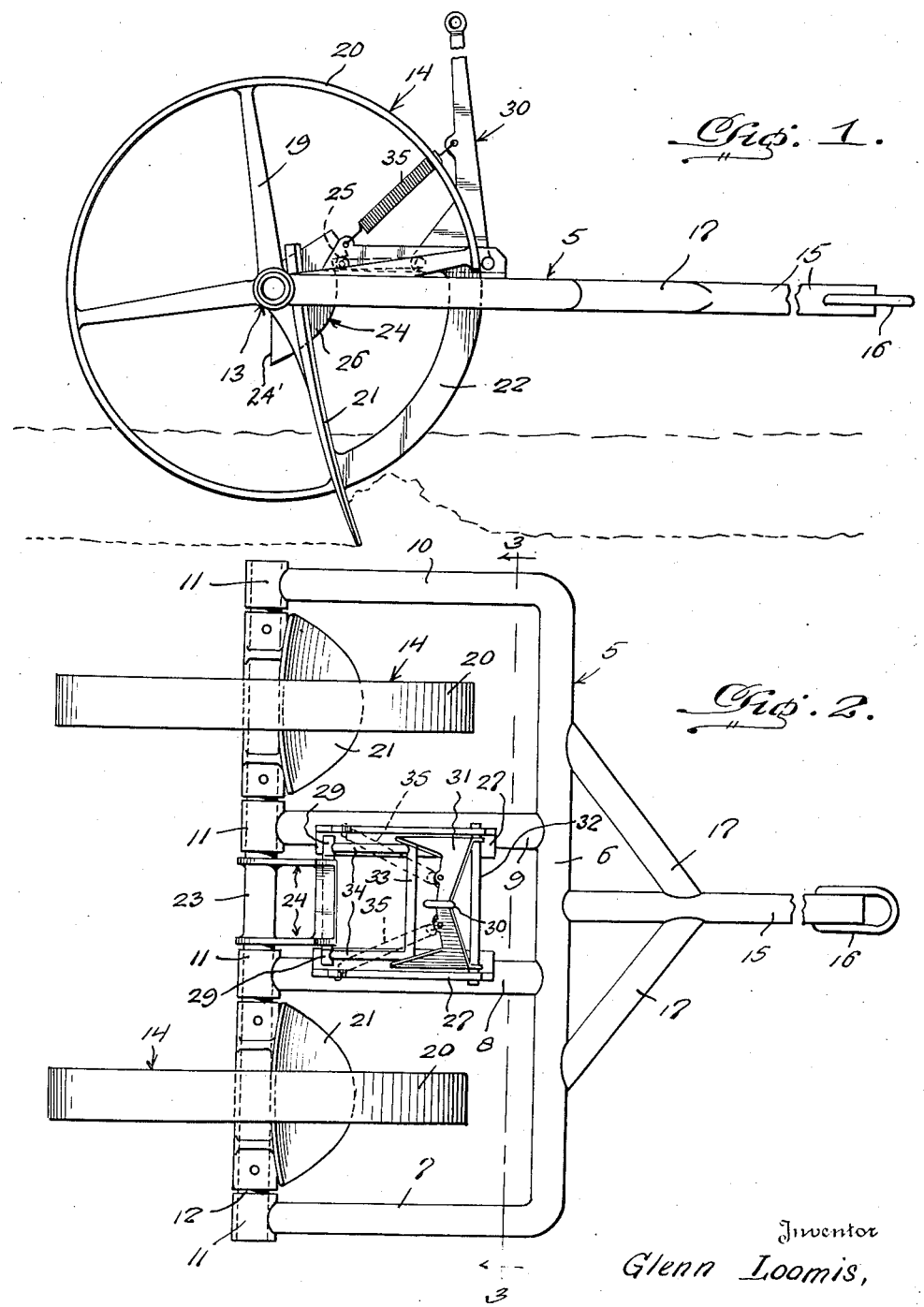

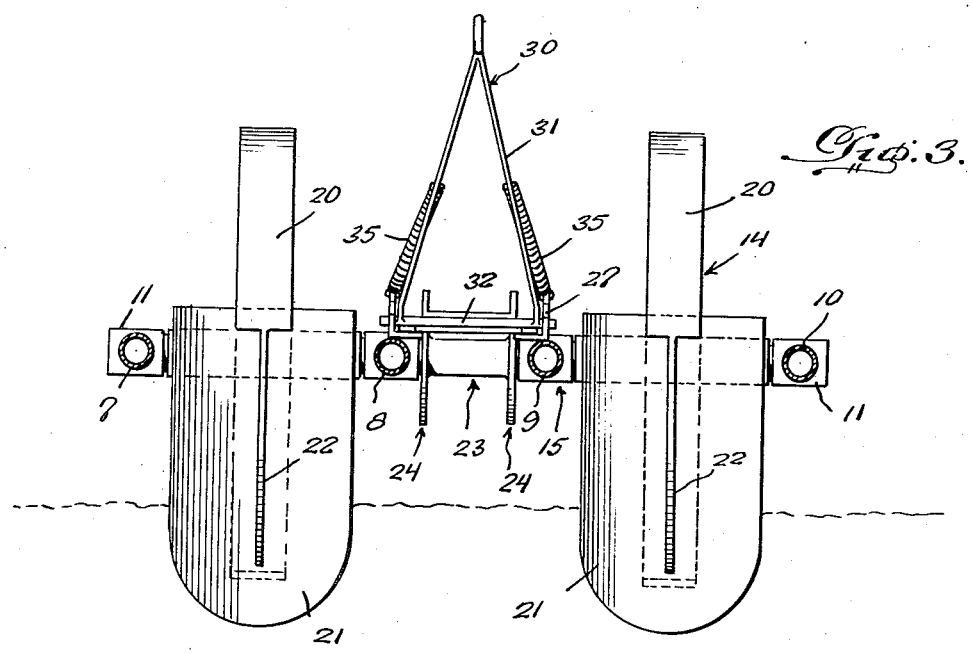
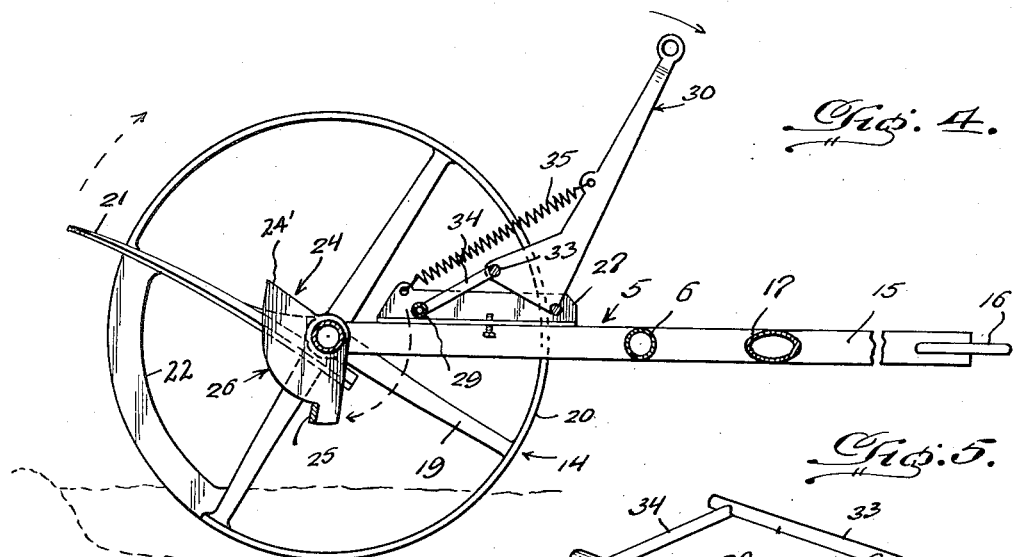
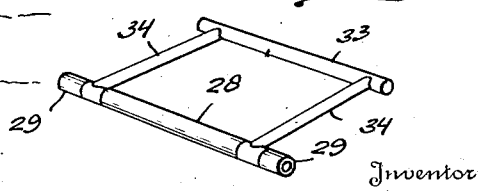

2,367,412

UNITED STATES PATENT OFFICE 2,367,412

IRRIGATION BORDER FILLER AND TEMPORARY DAM FORMING MACHINE

Glenn Loomis, McAllen, Tex.

Application June 7, 1943, Serial No. 489,980

3 Claims. (Cl. 97—55)

This invention relates to an irrigation border filler and temporary dam forming machine, and has for the primary object the provision of a device of the above stated character which will economically and efficiently carry out work in the construction of soil irrigation borders and check borders and the forming of temporary dams in irrigation ditches, eliminating the use of manual labor for such work and permitting the work to be more rapidly carried out.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a machine constructed in accordance with my invention.

Figure 2 is a top plan view illustrating the machine.

Figure 3 is a transverse sectional view taken on the line 3—3 of Figure 2.

Figure 4 is a longitudinal sectional view illustrating the machine in the act of forming a temporary dam.

Figure 5 is a perspective view illustrating the latch construction of the machine.

Referring in detail to the drawings, the numeral 5 indicates a frame preferably constructed of tubular stock so as to provide rigidity thereto combined with lightness in weight. The frame 5 is arranged horizontally and consists of a front member 6 and spaced parallel members 7, 8, 9 and 10. The members 7 and 10 form the sides of the frame while the members 8 and 9 coact in forming a support for a control mechanism. The free ends of the members 7, 8, 9 and 10 are in the form of bearings or journals 11 to rotatably receive an axle 12. Secured on the axle 12 are hubs 13 of combined wheels and digging devices 14.

Formed on and extending forwardly of the member 6 is a draft tongue 15 provided with a clevis 16 of a conventional construction to permit the tongue to be coupled to a prime mover such as a tractor or the like. Suitable braces 17 connect the tongue to the member 6.

Each combined wheel and digging device 14 consists of a hub 13 secured to the axle for rotation therewith, and radially extending spokes 19 formed on the hub and integral with a rim 20 having a cutout portion. Secured to the hub and extending radially therefrom is a shovel-like blade 21 which projects beyond the annular rim, as clearly shown in Figure 1. A curved member 22 connects the blade to one of the spokes and is comparatively narrow in thickness with one of its curved edges merging with the rim 20 so as to complete the rim 20 of annular formation.

A sleeve 23 is secured on the axle 12 and has formed thereon keepers 24 each including a shoulder 25 and a cam face 26. The keepers rotate with the axle and pass between the members 8 and 9.

Guides 27 constructed of angle iron stock are secured to the members 8 and 9 and parallel the latter and slidably support a latch rod 28 equipped with rollers 29 that ride on the guides. A control lever 30 including diverging portions 31 is secured to a pivot pin 32 journaled in the vertical portions of the guides. The lower ends of the portions 31 of the lever are flared and have secured thereto a rod 33 located laterally of the pivot pin 32 and also laterally of the pivotal axis of the lever 30. Arms 34 are integral with the rod 33 and carry at their free ends a latch rod or member 28. Coil springs 35 are connected to the lever 30 and to the guides 27 acting to retain the latch rod 28 in the path of movement of the keepers so that the shoulder 25 thereof may engage with the latch rod 28 and secure the axle as well as the wheels against rotation with the shovel type blade extending downwardly and forwardly of the axle, as shown in Figure 1, and in what may be termed the operative digging position of the device.

Whenever it is desired to release the blade from digging or operative position, as shown in Figure 1, the lever 30 is swung forwardly allowing the axle to rotate permitting the blade 21 to travel in the direction indicated by the arrow as shown in Figure 1 with the rims of the wheels contacting the ground. As soon as the shoulders 25 of the keepers 24 pass beyond the latch rod the lever 30 may be released so that the springs 35 may return the latch rod to a position within the path of movement of the keepers. As the keepers rotate the cam faces 26 engage the latch rod and shove the same forwardly with the latch rod riding the cam faces until engaged with the shoulders 25, whence the axle and wheels as well as the blades become stationary with the blades in a digging or operative position as shown in Figure 1.

In operation to form temporary dams within irrigation ditches or trenches, the machine is moved forwardly by the prime mover with the combined wheels and digging devices traveling in said ditches or trenches and locked against rotation. During this forward movement of the machine, the shovel-like blades will dig into the bottom of the ditches or trenches and accumulate at the front thereof mounds of soil and when desiring to form the temporary dams, the control lever is pivoted forwardly releasing the combined wheels and digging devices for rotation allowing the accumulated amount of soil to become mounded in pile form providing the temporary dams, the combined wheels and digging devices at this time rotate permitting the shovel-like blades to leave the mounds of soil at the selected places within the irrigating ditches or trenches. As the combined wheels and digging devices continue to rotate, the rims of the wheels support the machine until such time that the shovel-like blades come into operative or digging position whence they become locked to begin the next cycle of formation of temporary dams. Also this machine may be employed as a filler for the juncture between check borders and borders made by a machine for the purpose of irrigating selected areas of soil. When the borders and check borders are formed by a machine of a conventional construction, the check borders usually extend substantially at right angles to the borders and cross the latter and the machine in so forming the borders and check border brings about a break in the borders where the check borders meet or connect therewith requiring the filling of the borders usually carried out by man power. However, through the use of the present invention it can be made to fill the borders where intercepted by the check borders in a manner quite similar to that described in forming temporary dams within irrigating ditches or trenches, consequently permitting such work to be economically and rapidly carried out with man power reduced to a minimum.

The construction of borders and check borders by irrigation machines is clearly set forth in Patent 2,205,038, and, therefore, is well known in this art so that it is not deemed necessary to specifically explain in this application the type of irrigating machine for the construction of such borders as well as how the borders are arranged with respect to each other.

The keepers 24 provide straight faces 24' which may engage with the rollers 29 of the latch rod for the purpose of securing the wheels against rotation with the blades in non-digging position, the wheels then acting as runners so that the device may be pulled from place to place without acting on the soil.

While the portions 22 complete the rims of the wheels, the construction thereof will readily cut through the soil with the least amount of disturbance to the soil when the blades of the device are acting on the soil.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a device of the character described, a frame, means for coupling said frame to a prime mover, an axle journaled on the frame, wheels including hubs secured to the axle and rims connected to the hubs by spokes, said rims including a section having a relatively narrow tread, shovel-like blades secured to the hubs and to the narrow tread portions of the rims and protruding beyond said rims, and latch means for releasably securing the axle against rotation with said blades in digging position for piling of soil in mound formation.

2. In a device of the character described, a frame, means for coupling said frame to a prime mover, an axle journaled on the frame, wheels including hubs secured to the axle and rims connected to the hubs by spokes, said rims including a section having a relatively narrow tread, shovel-like blades secured to the hubs and to the narrow tread portions of the rims and protruding beyond said rims, a keeper secured to the axle and rotatable therewith and including a shoulder and a cam face, a latch rod slidably mounted on the frame and movable into the path of rotation of the keeper to engage with the shoulder for locking the blades in digging position, and means for operating the latch rod.

3. In a device of the character described, a frame, means for coupling said frame to a prime mover, an axle journaled on the frame, wheels including hubs secured to the axle and rims connected to the hubs by spokes, said rims including a section having a relatively narrow tread, shovel like blades secured to the hubs and to the narrow tread portions of the rims and protruding beyond said rims, a keeper secured to the axle and rotatable therewith and including a shoulder and a cam face, a latch rod slidably mounted on the frame and movable into the path of rotation of the keeper to engage with the shoulder for locking the blades in digging position, a lever pivoted on the frame, means connecting said lever to the latch rod, and a spring connected to the frame and the lever.

GLENN LOOMIS.